Jan. 12, 1971  N. A. LITVINOV  3,554,616
RUNNING GEAR FOR AN ENDLESS TRACK TRACTOR
Filed Aug. 28, 1968  3 Sheets-Sheet 1

¹

United States Patent Office 3,554,616
Patented Jan. 12, 1971

3,554,616
RUNNING GEAR FOR AN ENDLESS TRACK TRACTOR
Nikolai Alexandrovich Litvinov, Boris Mikhailovich Pozin, Vladimir Vasilievich Emelianenko, Chelyabinsk, U.S.S.R., assignors to Chelyabinsky Traktorny Zavod, U.S.S.R., Chelyabinsk, prospekt Lenina
Filed Aug. 28, 1968, Ser. No. 756,045
Int. Cl. B62d 55/16
U.S. Cl. 305—14         3 Claims

ABSTRACT OF THE DISCLOSURE

A running gear for an endless track tractor, in which the side equalizers are pivotably connected to each other and to the tractor frame, each of said equalizers being made as two longitudinal beams interconnected by spacers. Track support rollers are mounted on the beams and sprung by means of torsion bars.

---

The present invention relates to tractors, and more specifically to the running gears of endless track tractors employed as traction and transportation means.

Known in the art are running gears of endless track tractors wherein side equalizer bars (bogie brackets) with guiding idler wheels and spring-mounted track support rollers are hinged to the tractor frame, as well as to one another.

In the conventional running gears of endless track tractors, the springing of the track rollers is effected by means of equalizing arrangements wherein three track rollers are joined in one bogie. Such a design of track rollers springing involves the following disadvantages: complicated structure of the equalizing arrangement; hard mounting, dismounting and servicing of the track rollers; location of the resilient member of the equalizing arrangement outside the bogie, which increases the danger of damaging that member; and the connection of track rollers to the side equalizer through a series of hinges, which reduces the reliability of the operation of the rollers.

Principally similar disadvantages are characteristic of other conventional spring-mounted track rollers in the running gears of endless track tractors.

An object of the present invention is to provide a simple design of the springing of the track support roller.

Another object of the invention is to secure reliable operation of the sprung track rollers.

Still another object of the invention is to develop such a design of the sprung track roller that will ensure easiness of mounting, dismounting and servicing thereof.

In accordance with the above-mentioned and other objects the invention consists in that each track roller in the running gears of endless track tractors is sprung on the side equalizer bar through a torsion bar which is assembled in a pipe and has its ends located in supports fixed to the beams of the side equalizer (bogie bracket), the track roller suspension arm being rigidly attached to the middle part of said pipe.

It is advisable to connect the torsion bar pipe with the track roller suspension arm permanently, the pipe ends being so located in their supports as to allow pipe turning, while the strips of the torsion bar are jointed at one of their ends to one of the supports, and at the other end to the pipe, one of the pipe supports being made dismountable.

It is desirable to drill a channel in the track roller suspension arm to bring lubricant through the torsion bar pipe to the bearings of the roller.

Other objects and advantages of the invention will be revealed hereinbelow from the following description and the appended drawings, wherein.

In the embodiment of the invention considered herein, concrete terms are used for the sake of clarity. However, it should be borne in mind that the invention is not confined to the narrow terms so selected, and that each such term comprehends all the equivalent members acting in a similar way and intended to achieve the same objectives.

Figure 1:
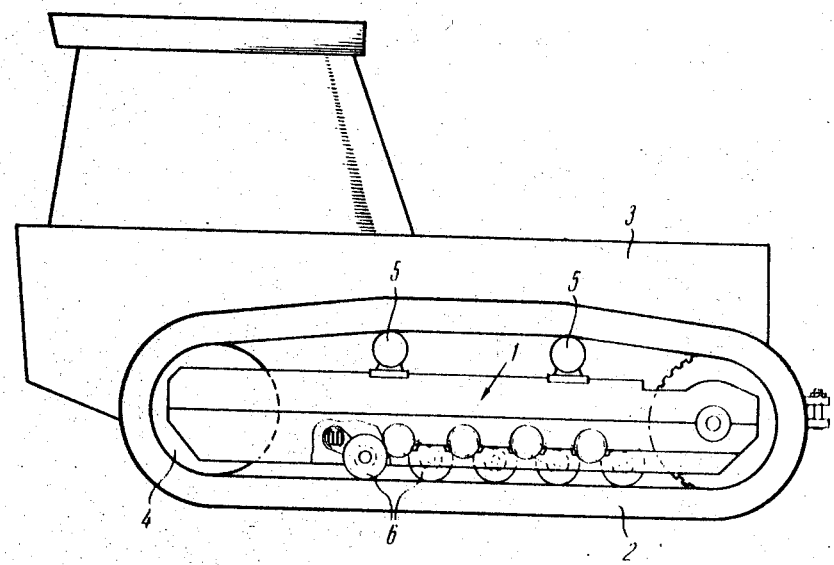
FIG. 1 illustrates the running gear of the endless track tractor in side elevation.

The running gear of an endless track tractor consists of two side equalizers (bogie brackets) 1 (FIG. 1) and endless chains 2.

Side equalizers 1 are connected with the tractor frame 3.

Each side equalizer (bogie bracket) 1 supports the following members: idler wheel 4, carrier rollers 5 and sprung track rollers 6.

Figure 2:
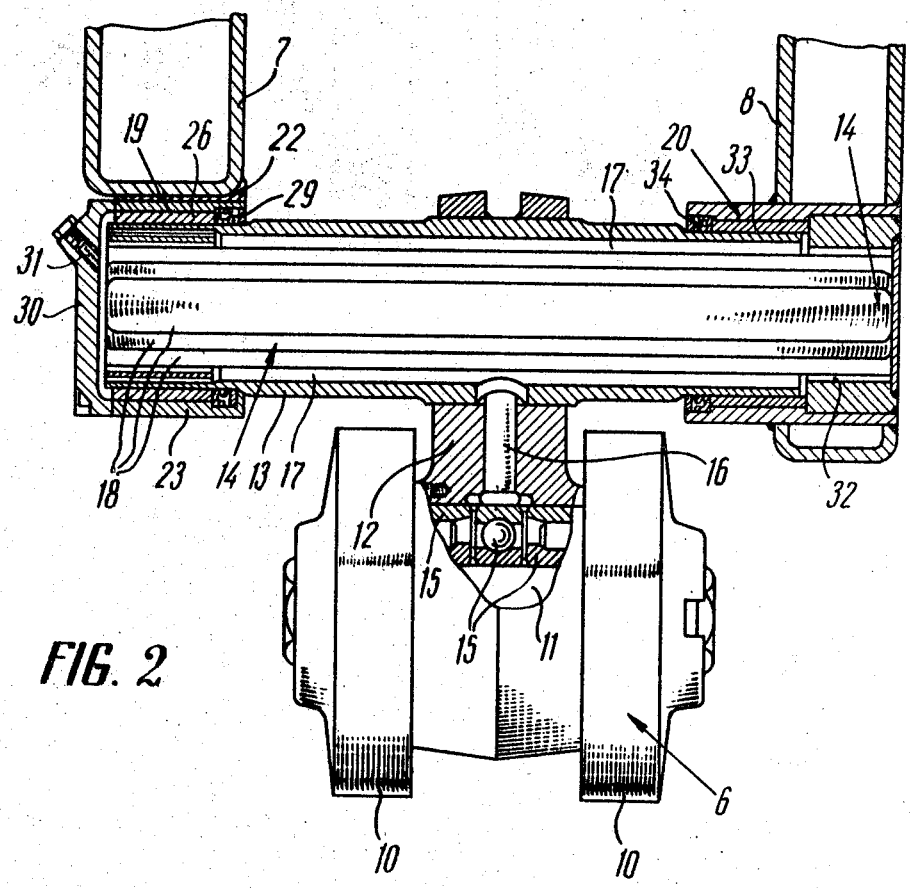
FIG. 2 illustrates an individually sprung track roller, according to the invention in sectional view.
Figure 3:
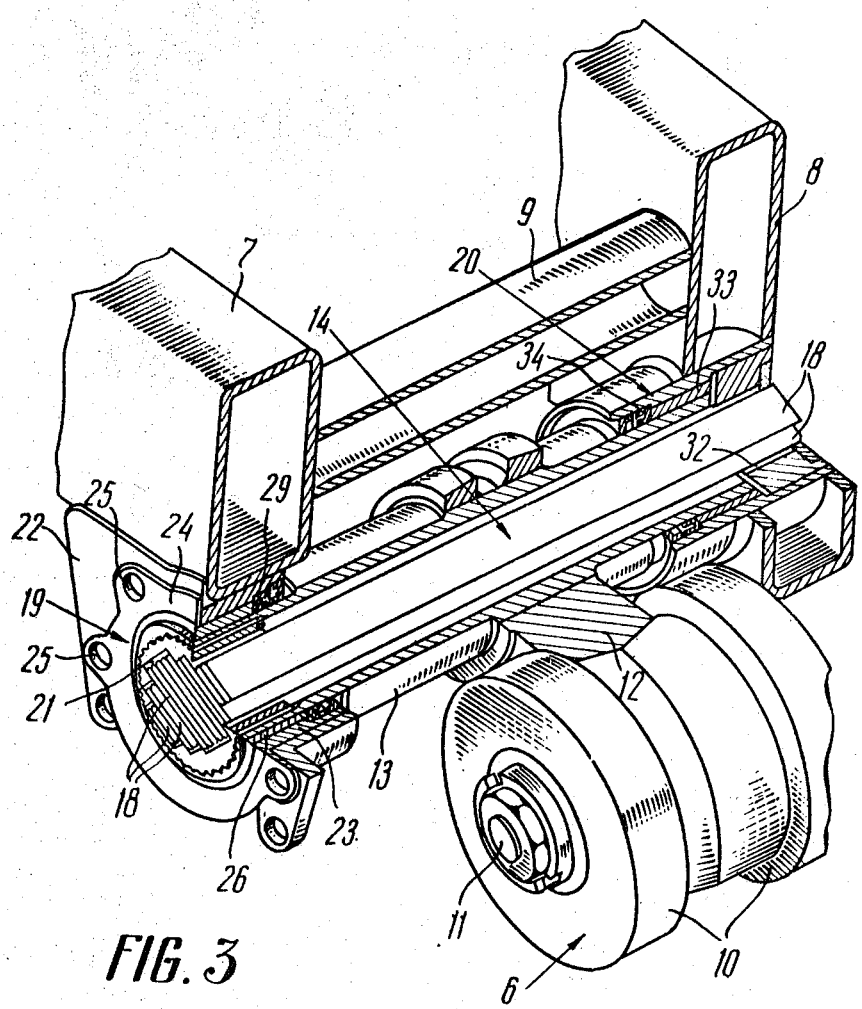
FIG. 3 is a perspective view thereof, partly in section.

Each side equalizer (bogie bracket) 1 comprises an outer beam 7 (FIG. 2), an inner beam 8, and spacers 9 (FIG. 3) which connect said beams to each other.

Each sprung track roller 6 comprises, according to the invention, rollers 10 fixed on an axle 11 (FIG. 2), and an arm 12 located between rollers 10, one end of arm 12 being connected to said axle, and the other end to pipe 13 of a torsion bar 14.

Arm 12 is mounted on axle 11 through bearings 15 and has a channel 16 to bring lubricant from space 17 of pipe 13 to said bearings of the track roller 6. Torsion bar 14 comprises a set of strips 18 placed in pipe 13, the ends of this pipe being fixed, with the possibility of turning, in a dismountable support 19 and a solid support 20.

The ends of strips 18 of torsion bar 14 are jointed at one side to the solid support 20, and at the other side to pipe 13. Pipe 13 has a shaped hole 21 at one end (FIG. 3) to receive strips 18 of the torsion bar 14.

Figure 4:
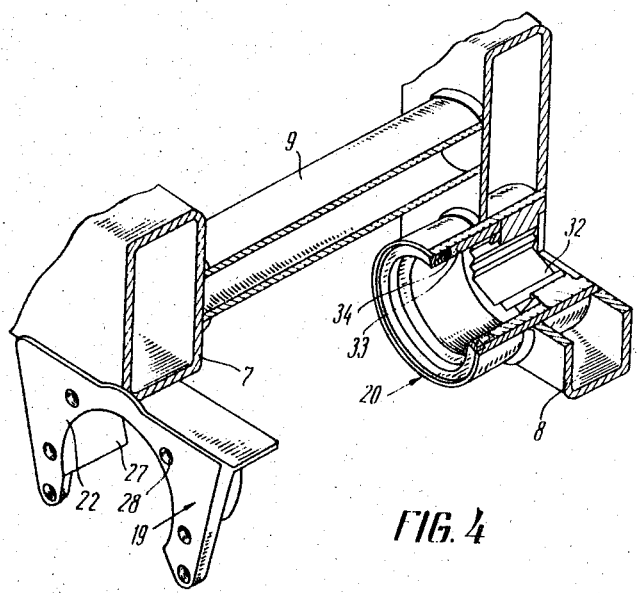
FIG. 4 is a perspective view, partly in section, of the supports of the beams of the side equalizer.

The dismountable support 19 consists of a horseshoe body 22 rigidly fixed to outer beam 7, and an adapter sleeve 23 with a flange 24 having holes 25. Slide bearing 26 is pressed into adapter sleeve 23. Body 22 has a face 27 (FIG. 4) to receive sleeve 23, and threaded holes 28 aligned with holes 25 of the dismountable support 19.

At the inner end of bearing 26 (FIG. 3) is a packing 29. After assembly, the dismountable support 19 is closed with a cover 30 (FIG. 2), which has a channel 31 for lubrication of the torsion bar and the bearings.

The solid support 20 is constituted as a sleeve with a shaped hole 32 (FIG. 4) to receive strips 18 (FIG. 3) of torsion bar 14. Bearing 33 with packing 34 is pressed into said sleeve.

The ends of pipe 13 of torsion bar 14 are mounted in bearings 26 and 33 of supports 19 and 20.

The springing of track rollers 6, according to the invention, provides the following advantages: location of the resilient member (torsion bar 14) within the space of the bogie, which permits making swinging bogies and thus improves the operation conditions for the running gear and the overall tractor, and also increases the reliability and the endurance of the running gear; easiness of mounting and dismounting due to the dismountable support 19; reduced number of lubrication points; and simple design.

Although the present invention is described with reference to a preferred embodiment thereof, it stands to reason that alterations and modifications are possible, without departing from the true spirit and scope of the invention, as shall be easily understood by those in the art. These alterations and modifications are to be considered as falling within the concept and scope of the invention as defined in the appended claims.

What we claim is:

1. A running gear of an endless track tractor, comprising a tractor frame, side equalizer bars pivotably connected to each other and to said frame, each of said equalizer bars comprising two interconnected longitudinal beams; supports fixed to said beams of the equalizer bars; a pipe having opposite ends turnably mounted in said supports; a torsion bar comprising a plurality of parallel strips passing inside said pipe and having one of the ends thereof connected to one of said supports, and the other of the ends to said pipe; an arm rigidly attached to said pipe intermediate the ends thereof, said arm having a free end, and a support roller mounted on the free end of said arm and capable of turning together therewith when the pipe is turned.

2. A running gear as claimed in claim 1, wherein one of the supports is dismountable and comprises a horseshoe casing with a detachable sliding bearing located therein.

3. A running gear as claimed in claim 1 comprising bearings for said roller, said arm having a channel to convey lubricant from the pipe to the bearings for the roller.

References Cited

UNITED STATES PATENTS

| 1,824,086 | 9/1931 | Knox | 305—27 |
| 2,342,110 | 2/1944 | Barber | 267—57X |

FOREIGN PATENTS

| 1,250,215 | 11/1960 | France | 280—124.3 |
| 1,300,315 | 6/1962 | France | 267—57 |

RICHARD J. JOHNSON, Primary Examiner

U.S. Cl. X.R.

267—57; 305—27